(12) United States Patent
Udd et al.

(10) Patent No.: US 6,690,890 B1
(45) Date of Patent: Feb. 10, 2004

(54) SINGLE FIBER SAGNAC INTERFEROMETER BASED SECURE COMMUNICATION SYSTEM

(76) Inventors: Eric Udd, 2555 NE. 205th Ave., Fairview, OR (US) 97024; Michael M. Morrell, 1323 E. Elm St., Tuscon, AZ (US) 85719; Peter F. Snawerdt, III, 267 Loggerhead Dr., Melbourne Beach, FL (US) 32951

(*) Notice: Subject to any disclaimer, the term of this patent is extended or adjusted under 35 U.S.C. 154(b) by 0 days.

(21) Appl. No.: 09/520,772

(22) Filed: Mar. 8, 2000

Related U.S. Application Data
(60) Provisional application No. 60/123,712, filed on Mar. 10, 1999.

(51) Int. Cl.$^7$ .................. H04B 10/00; H04B 10/12; G02B 6/00; G02B 6/42; G02B 6/26
(52) U.S. Cl. .................. 398/149; 398/140; 398/141; 398/142; 398/188; 385/11; 385/32; 385/39
(58) Field of Search .................. 398/140, 141, 398/142, 149, 188; 385/11, 32, 39

(56) References Cited

U.S. PATENT DOCUMENTS

| | | |
|---|---|---|
| 4,375,680 A | 3/1983 | Cahill et al. |
| 4,898,468 A | 2/1990 | Udd |
| 4,976,507 A | 12/1990 | Udd |
| 5,046,848 A | 9/1991 | Udd |
| 5,223,967 A | 6/1993 | Udd .................. 359/119 |
| 5,274,488 A | 12/1993 | Udd .................. 359/119 |
| 5,311,592 A | 5/1994 | Udd .................. 380/9 |
| 5,402,231 A | 3/1995 | Udd |
| 5,422,772 A | 6/1995 | Udd et al. .................. 359/119 |
| 5,455,698 A | 10/1995 | Udd .................. 359/119 |
| 5,636,021 A | 6/1997 | Udd |
| 5,694,114 A | 12/1997 | Udd .................. 340/506 |

OTHER PUBLICATIONS

Eric Udd in "Fiber Optic Sensors Based on the Sagnac Interferometer and Passive Ring Resonator", Fiber Optic Sensors: An Introduction for Engineers and Scientists, E. Udd Editor, Wiley 1991.
Eric Udd, Sagnac Interferometer Based Secure Communication System, Proceedings of OFS–11, Sapporo, Japan, May 21–24, 1996.

*Primary Examiner*—Jason Chan
*Assistant Examiner*—M. R. Sedighian
(74) *Attorney, Agent, or Firm*—George W. Finch

(57) ABSTRACT

The system includes a generally broadband, low coherence length light source that injects light into a fiber beamsplitter that is used to generate counterpropagating light beams in a Sagnac loop. The loop includes two facing fiber beamsplitters connected together at differing length inner legs, with one of the output legs of the second beamsplitter usually being connected to a in place optical fiber that ends with a phase modulator followed by a mirror. Formatted data is transmitted by impressing relative phase differences between the counterpropagating light beams. Optimum performance depends on appropriate choices for critical lengths in the system.

20 Claims, 4 Drawing Sheets

SINGLE FIBER SAGNAC INTERFEROMETER BASED SECURE COMMUNICATION SYSTEM

This application claims the benefit of U.S. Provisional Application No. 60/123,712 by Eric Udd et al., entitled, "Single Fiber Sagnac Interferometer Based Secure Communication System" which was filed on Mar. 10, 1999.

REFERENCE TO RELATED PATENTS

This disclosure describes means to provide the Sagnac secure fiber optic communication systems similar to those described in detail in U.S. Pat. Nos. 5,223,967, 5,274,488, 5,311,592, 5,422,772, and 5,455,698 using a single installed optical fiber. The teachings in those patents are incorporated into this disclosure by reference as though fully set forth below.

BACKGROUND OF THE INVENTION

This invention relates generally to fiber optic communications and more particularly to Sagnac interferometer based fiber optic communication systems that utilize counterpropagating optical beams to impress data on a loop by means of phase modulation. In order to make a system of this type practical for general use, a flexible, single fiber configuration is needed to support the base of currently installed optical fiber.

The need for high bandwidth secure communication systems that are amenable to usage in networks and which minimize the need for encryption is becoming increasingly acute as more sophisticated systems come on line. Generally, encryption reduces the data throughput of a given system by an order of magnitude when compared to non-encrypted throughput. The need for additional data throughput is expected to continue into the indefinite future with networks supporting ever greater numbers of users demanding higher and higher bandwidth. The advent of fiber optic telecommunication systems has opened up a new era of low cost, high bandwidth systems that are enabling a host of new applications. Sagnac secure fiber optic communication systems offer the prospect of transmitting this data securely, but heretofore, such has not been adaptable to the installed single fiber, single light band links.

SUMMARY OF THE INVENTION

There is provided by this invention a Sagnac interferometer based secure fiber optic communication system that allows transmission of data securely along conventional telecommunication fiber cables. This invention is designed to include many of the advantages of the conventional loop configuration of Sagnac secure fiber optic communication systems while minimizing dispersion and fiber compatibility problems by using a single fiber configuration between the transmitting and receiving ends of the system.

The system includes a light source that is generally broadband with a low coherence length. The light source injects light into a fiber beamsplitter that is used to generate counterpropagating light beams in a Sagnac loop. The loop includes two facing fiber beamsplitters connected together at both inner legs, with one of the output legs of the second beamsplitter being connected to a transmission fiber line that ends with a phase modulator followed by a mirror at a fixed distance. Formatted data may be transmitted by impressing relative phase differences between the counterpropagating light beams in a manner similar to that described with respect to other secure Sagnac interferometric communication systems. Optimum performance depends on appropriate choices for critical lengths in the system.

Therefore, it is an object of the present invention to provide a secure fiber communications system that can use conventional fiber optic communications fibers as installed for non-secure telecommunications.

Another object is to essentially eliminate the need to install special optical fibers and links to install a secure fiber communications system.

Another object is utilize installed zero dispersion single mode fibers in a secure fiber communications system whether they be designed for 1300 or 1550 nm light.

These and other objects and advantages of the present invention will become apparent to those skilled in the art after considering the following detailed specification including the drawings wherein:

DETAILED DESCRIPTION OF THE INVENTION

Figure 1:
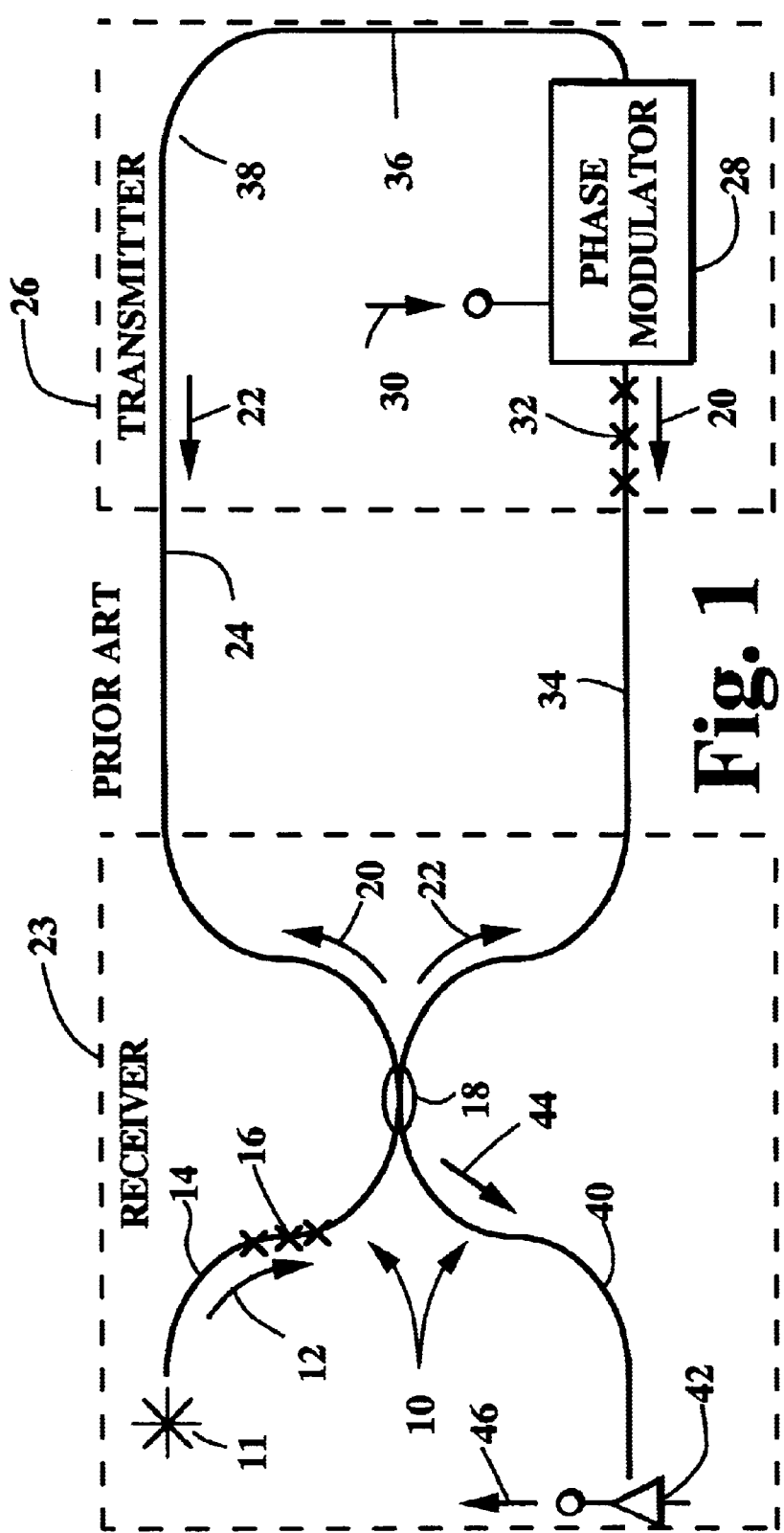
FIG. 1 is schematic representation of a typical prior art secure fiber optic communication system based on the Sagnac interferometer.

FIG. 1 shows a prior art Sagnac secure fiber optic communication system 10 such as shown in U.S. Pat. No. 5,311,592. A light source 11 that may be spectrally broadband generates a light beam 12 that enters into an optical fiber 14. A fiber depolarizer 16 may be used to scramble the polarization states of the light beam 12 and reduce residual preferential polarization. The light beam 12 is then split by a central beamsplitter 18 into the counterpropagating light beams 20 and 22. The light beam 20 exits the receiver area 23, passes through a fiber link 24 into the transmitter area 26 and reaches a phase modulator 28. Formatted electrical data 30 is then converted to corresponding phase modulation on the light beam 20 by the modulator 28. The light beam 20 then passes through a second polarization scrambler 32 used to reduce environmental effects, passes a second fiber link 34 and returns to the central beamsplitter 18. The light beam 22 traverses the fiber link 34, the polarization scrambler 32 and enters the phase modulator 28. The phase modulator 28 is offset from the center 36 of the fiber loop 38, which includes the lengths of fiber 24, 34 and the polarization scrambler 32 as well as the physical length of the phase modulator 28. Thus, the time of arrival of the light beam 22 at the phase modulator 28 is different (earlier in this example) from the time of arrival of the light beam 20 and a net phase difference between the two beams 20 and 22 results through the action of the electrically formatted data signal 30 impressed on the phase modulator 28. The light beam 22 then continues to circulate through the fiber loop 38 and returns via the fiber link 24 to the central beamsplitter 18.

When the two light beams 20 and 22 recombine on the central beamsplitter 18, their relative phase determines how much optical power is split into the fiber 14 and back to the light source 11 and how much is directed into the fiber 40 and onto the output detector 42. If the two light beams 20 and 22 are completely in phase, all the optical power from their recombined beam is directed toward the light source 11. If the two light beams 20 and 22 are 180° out of phase, all the light power is directed toward the output detector 42 via the fiber 40. For situations where the phase difference between the beams 20 and 22 is between 0° and 180°, the combined light beam power is split. The result is an amplitude modulated light beam 44 directed to the output detector 42. The amplitude modulated light beam 44 is converted by the output detector 42 to an electrical output signal 46.

One of the major issues with the Sagnac secure fiber optic communication system 10 as shown in FIG. 1 is that a simplex link requires two fiber lines (the links 24 and 34). It is possible to use wavelength division multiplexing by interleaving two Sagnac loops at 1300 and 1550 nm to reduce the number of lines to two for full duplex. However there is a very large installed base of single mode fiber designed for zero dispersion at 1300 nm and a second large base optimized for 1550 nm. Unfortunately, dispersion is very high in these fibers at the wavelengths they are not designed for. The net result is that the choice then becomes that of implementing full duplex systems using four fiber lines using simplex links similar to that of FIG. 1 or going to limited length wavelength division multiplexed systems of 1300 and 1550 nm because of dispersion.

An alternative approach is to use a single fiber system. Early versions of single fiber systems were described in U.S. Pat. No. 5,223,967. The present invention includes how operation of single fiber systems can be optimized by appropriate choices of fiber lengths. Also methods to optimize performance and add cable monitoring and alarm systems are described.

Figure 2:
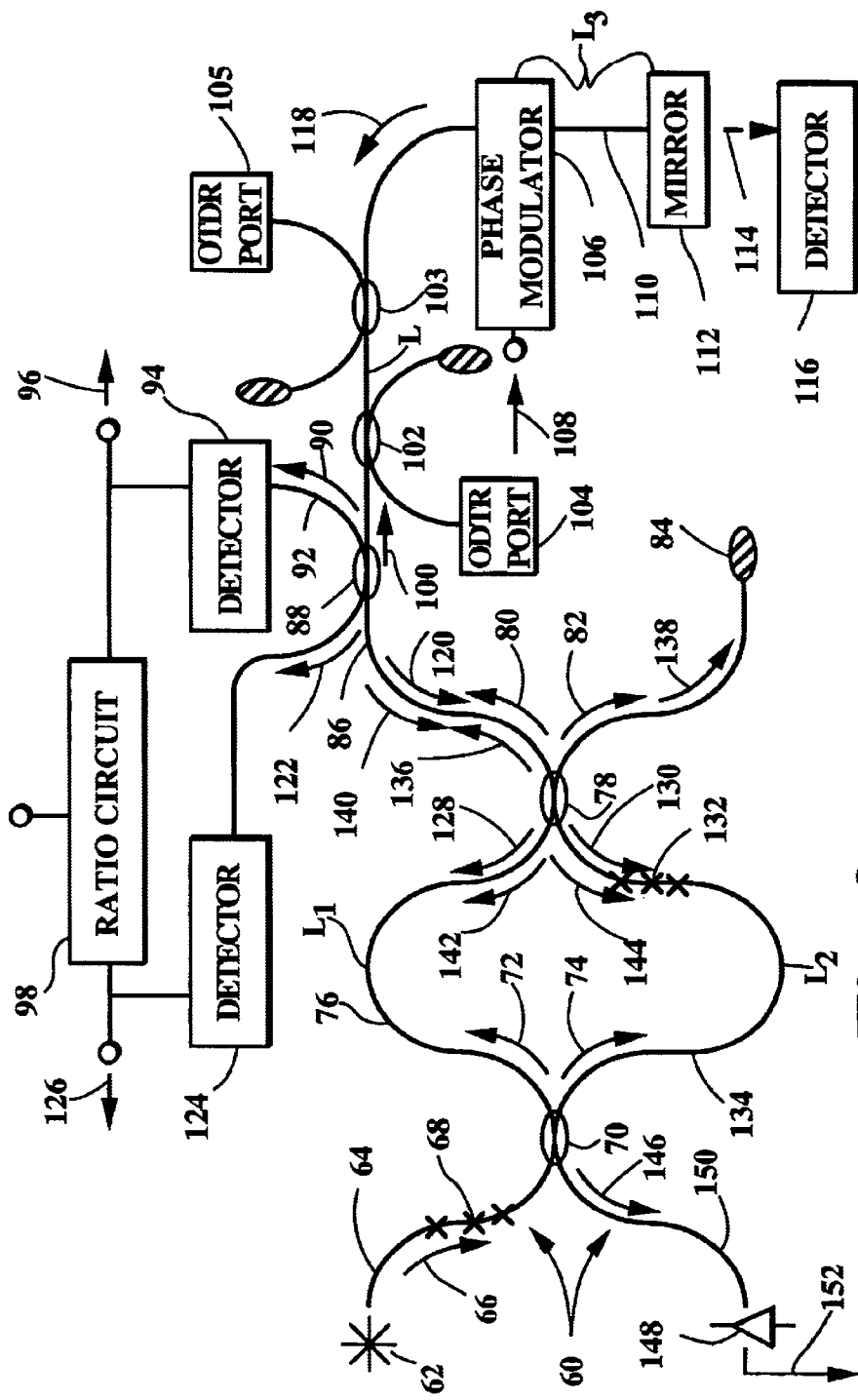
FIG. 2 is a schematic representation of a single fiber Sagnac interferometer secure communication system constructed in accordance with the present invention.

FIG. 2 shows a schematic diagram of a single fiber Sagnac interferometer communication system 60. Light from the light source 62 is coupled into the fiber 64 as the light beam 66. A fiber scrambler 68 may be used to reduce residual polarization of the light beam 66. The light beam 66 is then split by a central fiber beamsplitter 70 into the counterpropagating light beams 72 and 74. The light beam 72 enters a fiber leg 76 that is of length L1 and enters a second beamsplitter 78. At the beamsplitter 78 the light beam 72 is split into the light beams 80 and 82. The light beam 82 is directed toward a termination 84 that is designed to avoid back reflections and exits the system 60. It is possible to use the port defined by the termination 84 to support a second transmitter as described in U.S. Pat. No. 5,223,967.

The light beam 80 enters a fiber leg 86 of length L and passes an alarm/cable monitoring system beamsplitter 88. A portion of the light beam 80 is split off as the light beam 90, which via the fiber 92 reaches an alarm/cable monitoring detector 94. The electrical output 96 of the detector 94 can be used to support the monitoring of the cable 86 directly and/or via a ratio circuit 98.

The other portion 100 of the light beam 80 passes though wavelength division multiplexing elements 102 and 103 with their included wavelength division multiplexing optical time domain reflectometer (OTDR) ports 104 and 105 respectively. The OTDR ports 104 and 105 are used to determine the location of a tap detected by the alarm/cable monitoring detector 94 or other detection device. The beam 100 then enters a phase modulator 106, which impresses phase information on the light beam 100 corresponding to a formatted electrical data stream 108 (the length L being the distance from the beamsplitter 78 to the phase modulator 106 with L normally representing previously installed communication fiber). The light beam 100 then passes through a fiber leg 110 of length $L_3$ and is reflected off a mirror 112. A portion 114 of the light beam 100 may pass through the mirror 112 and onto a cable monitoring, alarm detector 116. Other components can be used to reverse the light flow such as short fiber loops and other beam turning devices The reflected portion 118 of the light beam 100 passes back through the fiber leg 110 and through the phase modulator 106 where it is again phase modulated via the action of the electrical formatted data 108. The light beam 118 then passes through the fiber 86 of length L, and the wavelength division multiplexing elements 104 and 102 and reaches the fiber beamsplitter 88 where it is split into the light beams 120 and 122. The light beam 122 is directed to a detector 124, whose output 126 is used to support a cable monitoring alarm system directly and/or via the output ratio circuit 98 which compares the electrical outputs 126 and 96.

The light beam 120 continues onto the beamsplitter 78 and is split into the light beams 128 and 130. The light beam 128 passes through the fiber leg 76 of length $L_1$ (from beamsplitter 70 to beamsplitter 78) onto the fiber beamsplitter 70. The light beam 130 passes through a polarization scrambler 132, which is part of a fiber leg 134 of length $L_2$. The lengths $L_1$ and $L_2$ are chosen so that their difference exceeds the coherence length of the light source 62, so that the beams 128 and 130, when they combine on the fiber beamsplitter 70, do not interfere, because during their two passes between the beamsplitters 70 and 78, they end up traveling different path lengths whose difference is more than the coherence length, as do all beams except the light beams which are the data carrying light beams, described below.

The light beam 74 passes through the fiber leg 134 of length $L_2$ (from beamsplitter 70 to beamsplitter 78) and the polarization scrambler 132 to reach the fiber beamsplitter 78, which splits the light beam 74 into light beams 136 and 138. The light beam 138 exits the port 84. The light beam 136 follows paths similar to that described in association with light beam 80. A light beam 140 derived from the light beam 136 returns to the beamsplitter 78 and is split into the two light beams 142 and 144. The light beam 142 propagates through the fiber leg 76 and returns to the beamsplitter 70. The light beam 144 propagates through the fiber polarization scrambler 132 and the fiber leg 84 to return to the fiber beamsplitter 70. The light beams 142 and 144 do not interfere on beamsplitter 70 because their paths 76 and 134 differ in length by more than the coherence length of the light source 62. The only light beams of the set 128, 130, 142 and 144 that can interfere are light beams 130 and 142 because they have both traversed the paths of length $L_1+L_2+2L+2L_3$. All other combinations of these light beams have a net path length difference of at least the absolute difference between $L_1$ and $L_2$ so there is no interference between them. Thus the two light beams 130 and 142, when they are in phase with respect to each other, result in light being directed toward the light source 62. When they are 180° out of phase, the combined light beam 146 is directed toward a detector 148 via the fiber leg 150. For conditions in between, the split ratio varies depending on the phase difference. The net result is that an amplitude modulated light beam 146 is directed the output detector 148 that in turn coverts the modulated light beam 146 into an amplitude modulated electrical signal 152, which contains the data of the electrical formatted data 108.

Figure 3:
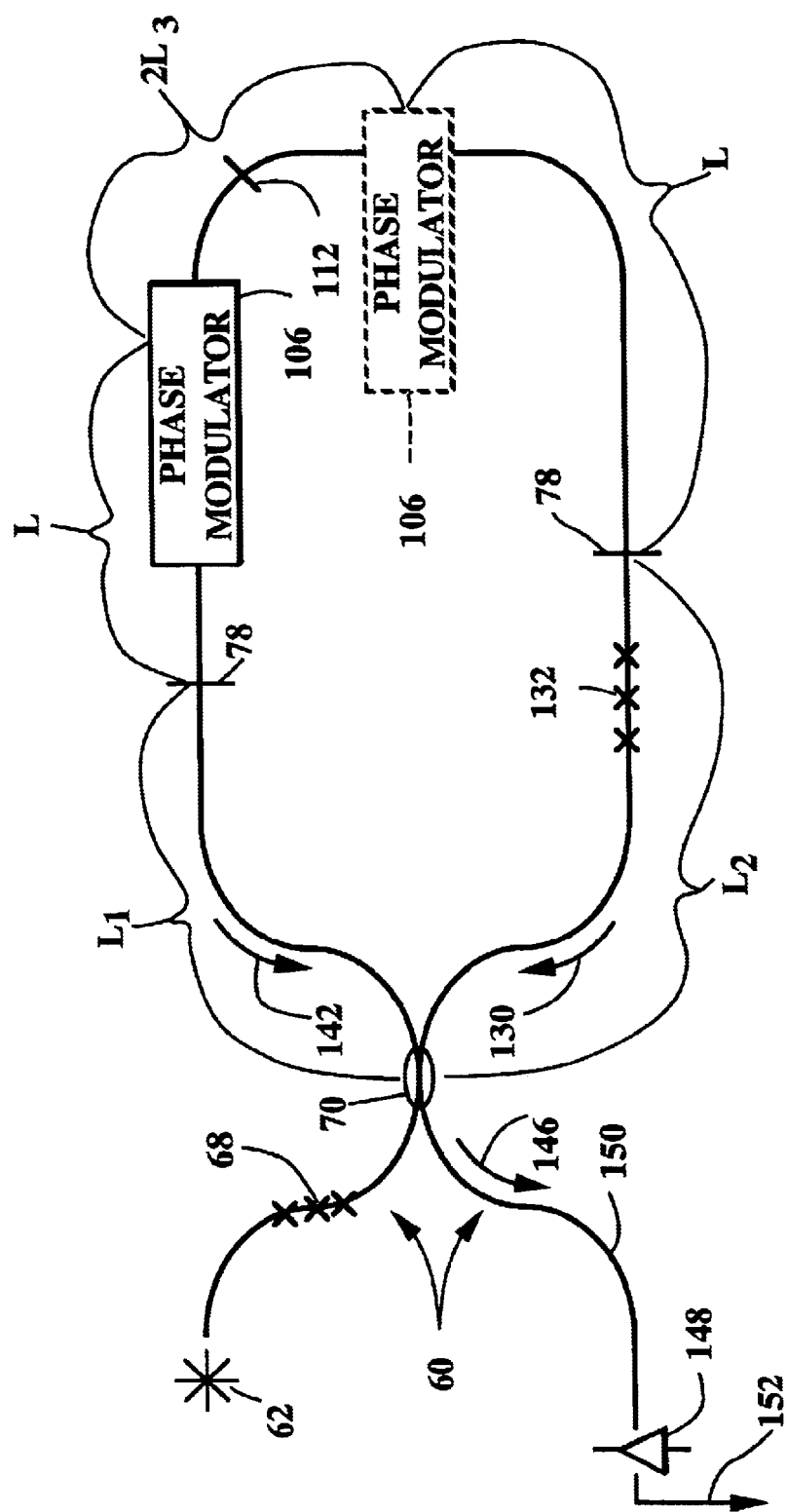
FIGS. 3 and 4 are schematic representations of the single fiber Sagnac interferometer secure communication system of FIG. 2 showing the preferred relationships of the path lengths.
Figure 4:
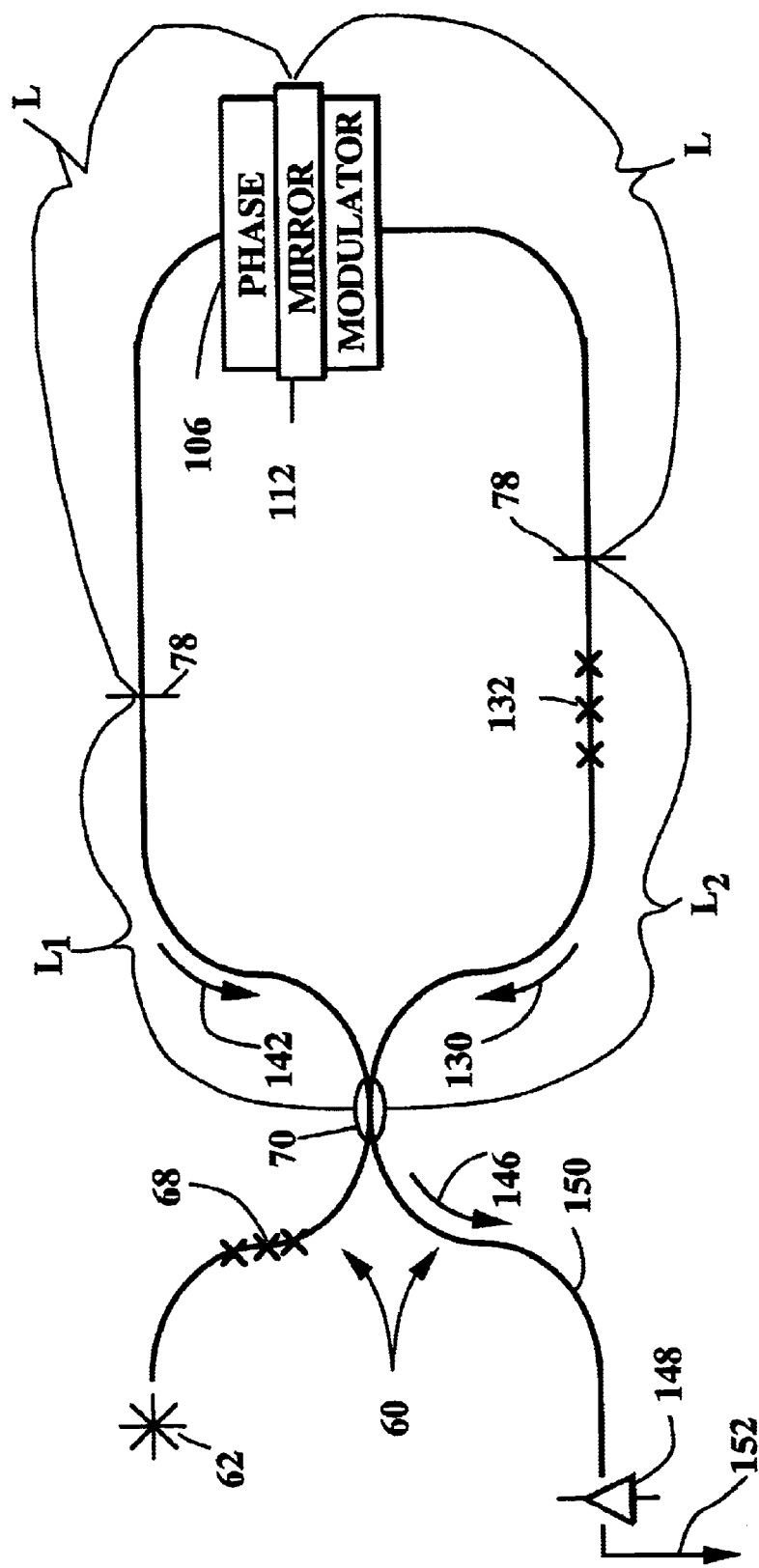

There are special operating conditions associated with the single fiber configuration illustrated by FIG. 2. FIG. 3 shows an unfolded version of the light paths of the system 60 followed by the light beams 130 and 142 originating and ending at the beamsplitter 70 that interfere with each other. Note that the two light beams traverse the phase modulator 106 in FIG. 3 twice. The exact amount of phase impressed on a light beam by this "double pass" system depends on the exact format of the electrical data stream driving the phase modulator and the length $L_3$ between the phase modulator 106 and the reflecting mirror 112. There are two important special cases where the appropriate choice of the length $L_3$ greatly simplifies the requirements on the input electrical data stream 108. The first is when the lengths $L_1$, $L_2$ and $L_3$ are chosen so that one "position" of the phase modulator 106 is in the center of the "loop" path for the beams 130 and 142 (shown in dashed outline). This means that both beams 130 and 142 arrive at the phase modulator 106 simultaneously, resulting in no net phase difference. Looking at the "unfolded" schematic of FIG. 3, this can be the case when $L_1+2L_3=L_2$ or $L_2+2L_3=L_1$. Both of these situations place one of the positions of the phase modulator 106 in the two pass system at the "center" of the unfolded Sagnac loop of FIG. 3. The 'second important case is when $L_3$ equals zero as shown in FIG. 4. This situation can be accomplished by putting the mirror 112 directly adjacent the phase modulator 106, effectively resulting in one phase modulator position instead of two.

What is claimed is:

1. An optical secure communication system including:
   a light source which produces a first light beam that has: a coherence length;
   a first beamsplitter positioned to receive the first light beam and split it into second and third light beams;
   a second beamsplitter positioned to receive the second and third light beams and split the second light beam into fourth and fifth light beams and the third light beam into sixth and seventh light beams;
   a first optical pathway extending between said first and second beamsplitters on which the second light beam travels;
   a second optical pathway of different length from said first optical pathway extending between said first and second beamsplitters on which the third light beam travels, the different length of said first and second optical pathways exceeding said coherence length;
   a third optical pathway extending from said second beamsplitter, on which the fourth and sixth light beams travel;
   a phase modulator positioned on said third optical pathway to phase modulate the fourth and sixth light beams passing therethrough with a data stream;
   beam reversal means positioned to direct the modulated fourth and sixth light beams that have passed through said phase modulator back through said phase modulator to said second beamsplitter; and
   a detector operatively connected to said first beamsplitter to receive an interference light beam from said first beamsplitter and to detect the data stream therefrom.

2. The optical secure communication system as defined in claim 1 further including:
   a polarization scrambler positioned between said light source and said first beamsplitter.

3. The optical secure communication system as defined in claim 1 further including:
   a polarization scrambler positioned between said first beamsplitter and said second beamsplitter.

4. The optical secure communication system as defined in claim 1 wherein said phase modulator and said beam reversal means are combined, whereby essentially there is no optical path length therebetween.

5. The optical secure communication system as defined in claim 1 further including:
   a light amplitude detector positioned to sample light passing between said second beamsplitter and said phase modulator.

6. The optical secure communication system as defined in claim 5 wherein said light amplitude detector includes:
   a direction sensitive light amplitude detector which compares the amplitude of light passing from said second beamsplitter to said phase modulator and light passing from said phase modulator to said second beamsplitter.

7. The optical secure communication system as defined in claim 1 further including:
   a fourth optical pathway between said phase modulator and said beam reversal means, said fourth optical pathway having a length so that twice the length of said fourth optical pathway plus the length of said first optical pathway equals the length of said second optical pathway.

8. The optical secure communication system as defined in claim 1 wherein said beam reversal means include:
   a mirror.

9. An optical secure communication system capable of using a single in place optical fiber as its transmission medium including:
   a light source which produces a first light beam that has: a coherence length;
   a first beamsplitter positioned to receive the first light beam and split it into second and third light beams;
   a second beamsplitter positioned to receive the second and third light beams and split the second light beam into fourth and fifth light beams and the third light beam into sixth and seventh light beams;
   a first optical pathway extending between said first and second beamsplitters on which the second light beam travels;
   a second optical pathway of different length from said first optical pathway extending between said first and second beamsplitters on which the third light beam travels, the different length of said first and second optical pathways exceeding said coherence length;
   a third optical pathway including the single in place optical fiber extending from said second beamsplitter, on which the fourth and sixth light beams are impressed;
   a phase modulator positioned on said third optical pathway to phase modulate the fourth and sixth light beams with a data stream;
   beam reversal means positioned with respect to said phase modulator to direct the modulated fourth and sixth light beams back to said second beamsplitter; and
   a detector operatively connected to said first beamsplitter to receive an interference light beam from said first beamsplitter and to detect the data stream therefrom.

10. The optical secure communication system as defined in claim 9 further including:
    a fourth optical pathway between said phase modulator and said beam reversal means, said fourth optical pathway having a length so that twice the length of said fourth optical pathway plus the length of said first optical pathway equals the length of said second optical pathway.

11. The optical secure communication system as defined in claim 9 wherein said beam reversal means include:
   a mirror.

12. The optical secure communication system as defined in claim 9 wherein said beam reversal means and said phase modulator are essentially in the same location.

13. The optical secure communication system as defined in claim 9 further including:
   a termination connected to said second beamsplitter in position to remove the fifth and seventh light beams from said system.

14. An optical secure communication system capable of using a single in place optical fiber as the transmission medium for the system including:
   a light source producing a first light beam having:
      a coherence length;
   a first beamsplitter positioned to receive the first light beam and split it into second and third light beams;
   a second beamsplitter positioned to receive the second and third light beams and split the second light beam into fourth and fifth light beams and the third light beam into sixth and seventh light beams;
   a first optical pathway extending between said first and second beamsplitters on which the second light beam travels;
   a second optical pathway of different length from said first optical pathway extending between said first and second beamsplitters on which the third light beam travels, the difference in length between said first and second optical pathways exceeding said coherence length;
   a third optical pathway including the single in place optical fiber extending from said second beamsplitter, on which the fourth and sixth light beams are impressed;
   a phase modulator means positioned on said third optical pathway to phase modulate the fourth and sixth light beams with a data stream;
   beam reversal means positioned with respect to said phase modulator to direct the modulated fourth and sixth light beams back to said second beamsplitter, whereby portions of said fourth and sixth modulated light beams combine interferometrically at said first beamsplitter; and
   a detector operatively connected to said first beamsplitter to receive the interferometrically combined portions of said fourth and sixth modulated light beams from said first beamsplitter and to detect the data stream therefrom.

15. The optical secure communication system as defined in claim 14 wherein said phase modulator and said beam reversal means are combined, whereby essentially there is no optical path length therebetween.

16. The optical secure communication system as defined in claim 14 further including:
   a light amplitude detector positioned to sample light passing between said second beamsplitter and said phase modulator; and
   means producing an alarm output upon said light amplitude detector's detection of a change in light amplitude.

17. The optical secure communication system as defined in claim 16 wherein said light amplitude detector includes:
   a direction sensitive light amplitude detector to compare the amplitude of light passing from said second beamsplitter to said phase modulator and light passing from said phase modulator to said second beamsplitter.

18. The optical secure communication system as defined in claim 14 further including:
   a fourth optical pathway between said phase modulator and said beam reversal means, said fourth optical pathway having a length so that twice the length of said fourth optical pathway plus the length of said first optical pathway equals the length of said second optical pathway.

19. The optical secure communication system as defined in claim 14 wherein said beam reversal means include:
   a mirror.

20. The optical secure communication system as defined in claim 14 further including:
   a polarization scrambler positioned between said light source and said first beamsplitter; and
   a polarization scrambler positioned in said second optical pathway.

* * * * *